G. G. ROOKLEDGE.
STICKER.
APPLICATION FILED OCT. 21, 1918.
1,307,792.
Patented June 24, 1919.
Fig. 1.
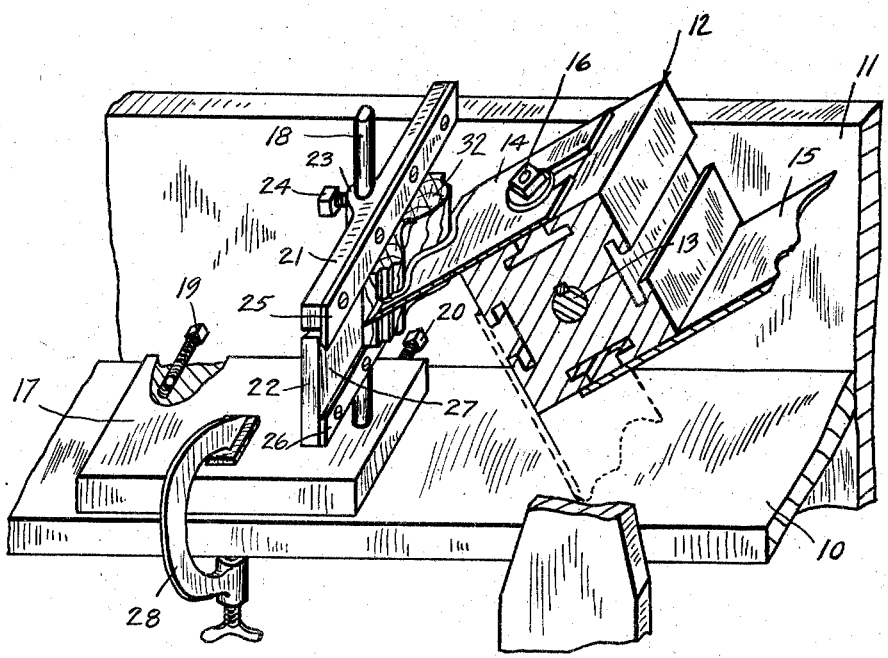
Fig. 2.
Fig. 3.
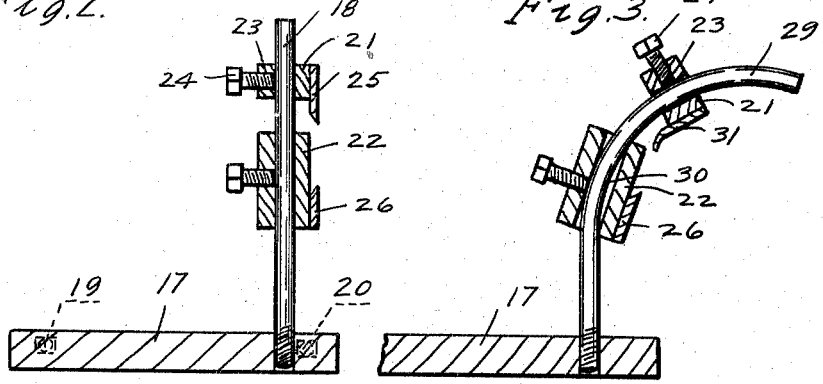
INVENTOR.
George G. Rookledge,
BY Hazard & Miller
ATTORNEYS.

UNITED STATES PATENT OFFICE.

GEORGE G. ROOKLEDGE, OF SAN GABRIEL, CALIFORNIA.

STICKER.

1,307,792.   Specification of Letters Patent.   Patented June 24, 1919.

Application filed October 21, 1918. Serial No. 259,159.

*To all whom it may concern:*

Be it known that I, GEORGE G. ROOKLEDGE, a citizen of the United States, residing at San Gabriel, in the county of Los Angeles and State of California, have invented new and useful Improvements in Stickers, of which the following is a specification.

My invention relates to a knife setting gage for use in connection with molding machines and the like.

An object of my invention is to provide a knife setting gage by means of which the knives in the cutting head of a molding machine or like machine may be set with reference to an easily accessible measuring surface instead of with reference to the machine table surface.

Another object is to provide a means for testing the accuracy of the knife edge form.

With these and other objects in view my invention consists in the construction, combination and arrangement of parts hereinafter described and claimed.

In the accompanying drawings which form a part of this specification

Figure 1 is a fragmentary view in perspective of parts of a molding machine showing one of its cutting heads and a gage, embodying the principles of my invention, as used in connection therewith.

Fig. 2 is a central longitudinal vertical section of the knife setting gage shown in Fig. 1.

Fig. 3 is a central longitudinal vertical section of a modified form of my knife setting gage adapted to hold a mold form at an oblique angle to the table and head.

Fig. 1 shows the position of a knife setting gage in relation to the parts of the molding machine, 10 being a fragment of the table, 11 a fragment of the vertical guide plate and 12 a horizontal knife head, keyed to a shaft 13 which is journaled in the frame work of the molding machine. Two knives 14 and 15 are shown fixed on the knife head by clamp bolts 16.

As is well known, it is very necessary that the several knives be mounted on the knife head so that their cutting edges clear the table surface at exactly the same distance so that when the stock passes between them and the table top a smooth uniform mold surface may be obtained. In setting the knives the usual method is to lay a pattern mold on the table top under the knife head and to adjust the knives to this pattern mold. This is very inconvenient because the inaccessible position of the knife edges in their lowermost position makes it difficult to see clearly.

The object of my gage is to provide a more readily accessible measuring face. The gage consists of a base block 17 in which is fixed a supporting shank 18 screwed into one end of the base block at right angles to the base block. Tapped holes are formed in one edge of the base block to receive set screws 19 and 20 which project horizontally against the guide plate 11. Parallel clamping arms 21 and 22 which extend crosswise of the gage perpendicular to the supporting shank are adapted to be moved upwardly and downwardly on the supporting shank. These clamping bars are provided with enlargements or bosses 23 through which holes are bored to receive the supporting shaft. These bosses are preferably formed near the center of the clamping bars. Set screws 24 are screwed into tapped holes in the bosses so as to press against the supporting shank, the back side of which is slightly flattened to provide an adequate bearing surface and thus prevent the clamping arms from turning on the supporting shank out of alinement with each other and with the base block.

A bevel edged strip 25 with the beveled edge turned downwardly is fixed on the upper clamping bar and a similar bevel edged strip 26 with its beveled edge turned upwardly is fixed on the lower clamping bar. These serve as clamping jaws which hold the pattern mold. The measuring face of the gage is the front face 27 of the lower clamping bar. The gage as described is held in position on the table by an ordinary screw clamp 28.

The modified form of my clamping gage as shown in Fig. 3 is similar to that described, except that the supporting shank 29 is bent at a distance above the plate into a uniformly curved shank. This necessitates the provision of elongated or elliptical holes 30 in the clamping bars to permit their being shifted on the curved part of the supporting shank. The beveled edge of the clamping strip 31 on the upper clamping bar is bent to bring it into alinement with the lower clamping strip.

Operation: In the use of the gage the set screws 19 and 20 are adjusted to secure proper spacing of the gage from the guide plate 11. The gage is then set on the table and placed so that the measurement between the measuring face 27 and the center of the shaft 13 is exactly equal to that between the surface of the table 10 and the center of the shaft 13. The screw is then applied and the base plate securely clamped to the table. The lower clamping bar 22 is then set at the desired height and the pattern mold 32 is pressed against the measuring surface 27, with its lower edge resting on the lower clamping jaw 26. The upper clamping bar 21 is then lowered and set with its clamping jaw 25 gripping the upper edge of the pattern mold. The knife edges one by one are now brought into engagement with the pattern mold as illustrated in Fig. 1 and the clamp screws tightened to hold them firmly in position.

It is evident that the distance of the measuring surface 27 from the center of the shaft being the same as that of the table surface the knife edges will have exactly the same spaced relation from the table top that they have from the measuring surface of the gage and consequently perfect action of the knives is assured.

If it is desired to test the accuracy of the knife edge form, a piece of molding of the desired form is inserted between the clamping jaws as described and the knives revolved one after another into engagement with the pattern form and compared.

While I have shown the preferred construction of my knife setting gage as now known to me, it will be understood that various changes in construction and combination of parts may be made by those skilled in the art without departing from the spirit of my invention as claimed.

I claim:

1. A knife setting gage, for use on a molding machine or a like machine equipped with a multiplicity of knives mounted on a revolving head, comprising a base block, a vertical supporting shank screwed into said base block, clamping bars adjustably mounted on said supporting shank, and means for adjustably holding said clamping bars in spaced relation to each other and to said base block.

2. A knife setting gage, for use on a molding machine or a like machine equipped with a multiplicity of knives mounted on a revolving head, comprising a base block adapted to be clamped to the machine table, a vertical supporting shank screwed into said base block, clamping bars adjustably mounted on said supporting shank in parallel relation to each other and to the machine table, set screws in said clamping bars adapted to engage with said supporting shank whereby said clamping bars are held in spaced relation to each other and to the base block.

3. A knife setting gage for stickers comprising, a base block adapted to fit the machine table; clamping bars mounted upon the base block and adapted for vertical adjustment, one of the clamping bars being provided with a measuring surface; and clamping jaws extending past the measuring surface, so that a pattern mold may be placed against the measuring surface and adjusted to a proper position and held in place by the clamping jaws.

4. A knife setting gage comprising, a clamping bar having a measuring surface; a second clamping bar in opposition to the first clamping bar; clamping jaws extending from the clamping bars past the measuring surface, so that a pattern mold may be placed against the measuring surface and held in place by the clamping jaws; and means for adjustably mounting the clamping bars upon the table of a sticker, so that the knives of the sticker may be accurately set by fitting them against the pattern mold.

In testimony whereof I have signed my name to this specification.

GEORGE G. ROOKLEDGE.

Copies of this patent may be obtained for five cents each, by addressing the "Commissioner of Patents, Washington, D. C."